United States Patent

Klehm, Jr.

[15] 3,693,131

[45] Sept. 19, 1972

[54] PROGRAMMABLE DUAL-IN-LINE PIN CONNECTOR FOR INTEGRATED CIRCUIT UNITS

[72] Inventor: William G. Klehm, Jr., Farmington, Mich.

[73] Assignee: Burroughs Corporation, Detroit, Mich.

[22] Filed: Nov. 1, 1971

[21] Appl. No.: 194,396

[52] U.S. Cl.........339/17 CF, 317/101 CC, 339/18 R, 339/176 M

[51] Int. Cl............................H05r 1/16, H01r 23/02

[58] Field of Search.317/101 CC, 101 CP; 339/17 R, 339/17 C, 17 CF, 18 R, 18 P, 31, 32, 65, 66, 105 B, 176 M, 191 M, 192 R, 192 T, 193 VS, 174

[56] References Cited

UNITED STATES PATENTS

| | | | |
|---|---|---|---|
| 3,293,590 | 12/1966 | Woolsey | 339/192 R |
| 3,345,541 | 10/1967 | Cobaugh et al. | 339/17 CF |
| 3,416,348 | 12/1968 | Carter et al. | 317/101 CC |

FOREIGN PATENTS OR APPLICATIONS

| | | | |
|---|---|---|---|
| 831,656 | 9/1938 | France | 339/119 C |

OTHER PUBLICATIONS

Byrnes et al., " Installing Changes on a Multilayer Board," IBM Tech. Disc. Bulletin, Vol. 7, No. 9, Feb. 1965, p. 761

*Primary Examiner*—Stephen J. Novosad
*Assistant Examiner*—Lawrence J. Staab
*Attorney*—Paul W. Fish et al.

[57] ABSTRACT

A dual-in-line electrical pin connector is so designed that when combined with an integrated circuit unit or package it is capable of modifying the connections performed by the leads of the latter. A body of electrically insulating material is provided with a channel so dimensioned as to substantially wholly receive an integrated circuit unit therewithin and is provided with two pairs of rows of correspondingly positioned lead receiving recesses which open into the channel and which are so distributed with respect to the channel that one pair of rows is adjacent to one side wall of the channel and the other pair of such rows is similarly adjacent to the other side wall of the channel. One row of each such pair of rows may have its recesses fitted with an electrical contact while the other row may be devoid of such contacts and thereby enable each lead of the integrated unit received within the channel to have its leads selectively insertable into the correspondingly positioned recessed of one or the other of such pair of recess rows.

12 Claims, 5 Drawing Figures

PATENTED SEP 19 1972 3,693,131

SHEET 1 OF 2

FIG. I

INVENTOR.
WILLIAM G. KLEHM, JR.

BY Raymond B. Parker

ATTORNEY

PROGRAMMABLE DUAL-IN-LINE PIN CONNECTOR FOR INTEGRATED CIRCUIT UNITS

FIELD OF THE INVENTION

The invention relates generally to integrated circuit components and more particularly to a programmable dual-in-line pin connector for use in such art.

SUMMARY OF THE INVENTION

It is accordingly an important object of the invention to provide an improved electrical connector block for use with integrated circuit units and so designed as to provide a choice of receiving recesses or slots for each lead of an integrated circuit unit.

Another important object of the invention is to provide a programmable electrical connector block for use with integrated circuit units and capable of protectively receiving a circuit unit of this character and all of the leads thereof in either one of two different positions for programming purposes.

A further important object of the invention is to provide an improved programmable assembly including an integrated circuit unit and a pin connector block to which the unit is connected which enables various circuit connections to be performed by the leads thereof and thus increase the combinations of the circuit connections that may be performed by such an assembly.

A still further important object of the invention is to provide a low cost programmable connector block assembly for use with integrated circuit units which is easy to use for accomplishing various programs.

In carrying out the objects of this invention, an improved dual-in-line pin connector is so designed that when combined with an integrated circuit unit or package it is capable of modifying the electrical connections performed by the leads of the latter. A channel-shaped body or block of electrical insulating material forms the dual-in-line pin connector to which an integrated circuit unit is coupled, the latter lying within the channel of the block and being partially protectively enclosed thereby. The connector block is provided with a plurality of rows of recesses having their respective openings so positioned within the channel that each lead of an integrated circuit unit may enter at least one of two of such recesses and thus increase the number of connections that may be performed by the assembled block and unit. More specifically, as illustrated herein, the channelled pin connector block is provided with two pairs of rows of lead receiving recesses opening into the channel and being so distributed with respect to the channel that one pair of rows is adjacent to the juncture of one side wall of the channel with the bottom thereof and the other pair of such rows is similarly adjacent to the juncture of the other side wall of the channel with the bottom thereof, and furthermore that one row of each such pair of rows is nearer to the centerline of the channel than the other row recesses fitted with an electrical contact element while the other row may be devoid of such contact elements with the result that each lead of the integrated unit with which the block is associated may be directed into one or the other of such recesses and either be connected or not connected into an electrical circuit.

These and other objects, advantages and meritorious features of the invention will become more fully apparent from the following specification, appended claims and the accompanying drawings wherein:

DESCRIPTION OF A PREFERRED EMBODIMENT OF THE INVENTION

Figure 1:
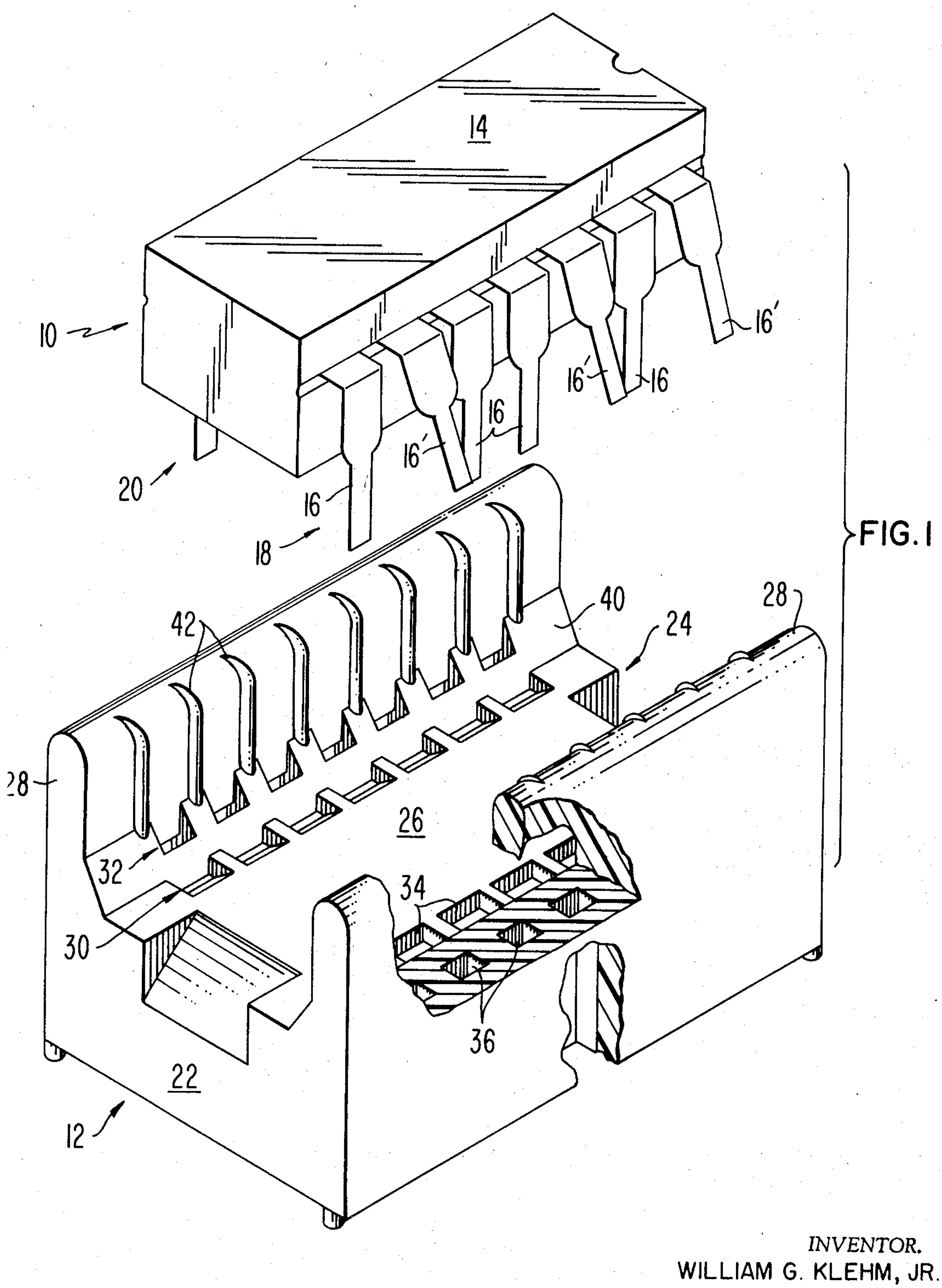
FIG. 1 is a perspective view, partially broken away in section, of the assembly of a dual-in-line pin connector block of the present invention and an integrated circuit unit disposed in position for connection thereto.

Referring to the drawings and with particular reference initially to FIG. 1, there is shown, generally, two components of an integrated circuit assembly, namely, a linear type integrated circuit unit or package identified generally at 10 and a dual-in-line pin connector generally indicated at 12 and constructed in accordance with this invention. The integrated circuit package 10 includes an exterior housing in the form of an electrical insulated body 14 herein shown of rectangular configuration and preferably formed of hardened plastic material. Electrical leads 16 of flat strip character are connected interiorly of the body 14 with the integrated circuit housed therein and project from the body for connection to an external circuit. More specifically in this connection, the leads 16 are formed in two rows of such leads which are generally indicated at 18 and 20 and shown projecting in one general direction away from the body 14. As shown in FIG. 1 and also in FIG. 2, the two rows of leads project from opposite sides from the body 14 and then are bent to extend downwardly past the bottom side of the body for interfitting engagement with recesses in the pin connector component 12 as will be later described herein.

Before proceeding to the description of the pin connector 12 attention is called to the fact that for the practice of this invention the external portions of the leads or tabs are bent at two different angles, the leads 16 of each row extending straight downwardly and parallel to one another whereas certain leads 16' are bent at a slight angle to the leads 16 and outwardly with respect to the body 14. The bending of these leads 16' is undertaken before the integrated circuit unit is assembled with the pin connector, and this operation may be performed by a die shaped to bend certain selected ones but not all of the leads at the desired outward angle to perform the desired programming for which the pin connector 12 is especially designed.

Figure 2:
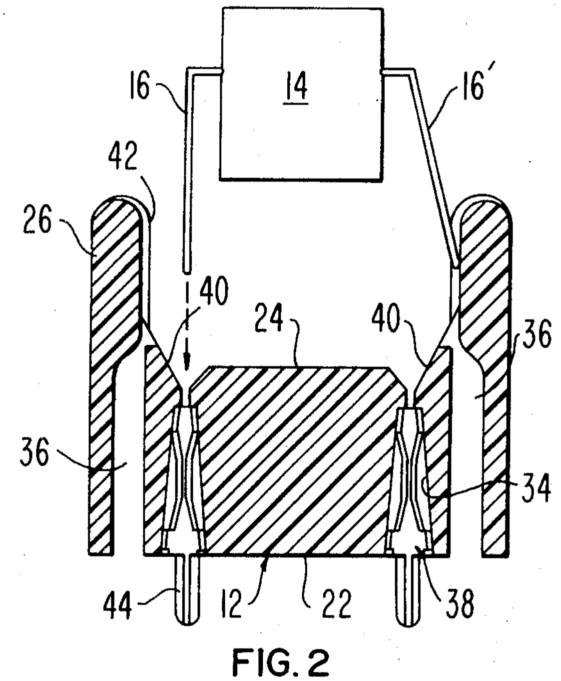
FIG. 2 is a vertical cross-sectional view through the pin connector block of FIG. 1 showing the initial position of an integrated circuit unit as it enters the channel of the block for operative connection therewith.
Figure 3:
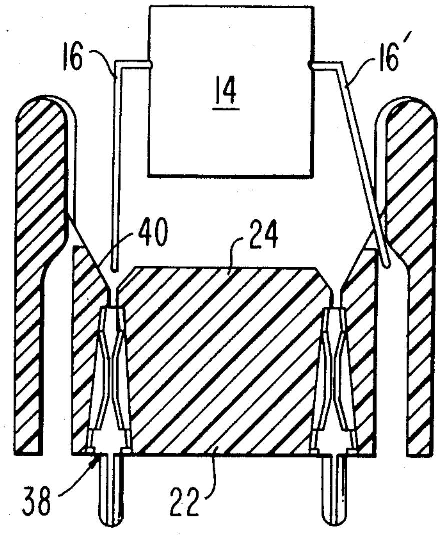
FIG. 3 is a similar cross-sectional view of connector block showing an intermediate position of the integrated circuit block of FIG. 1 with the left lead thereof shown entering an inner recess of the channel while the corresponding lead on the other side of the unit is shown entering the mouth of an outside recess of the channel.
Figures 4, 5:
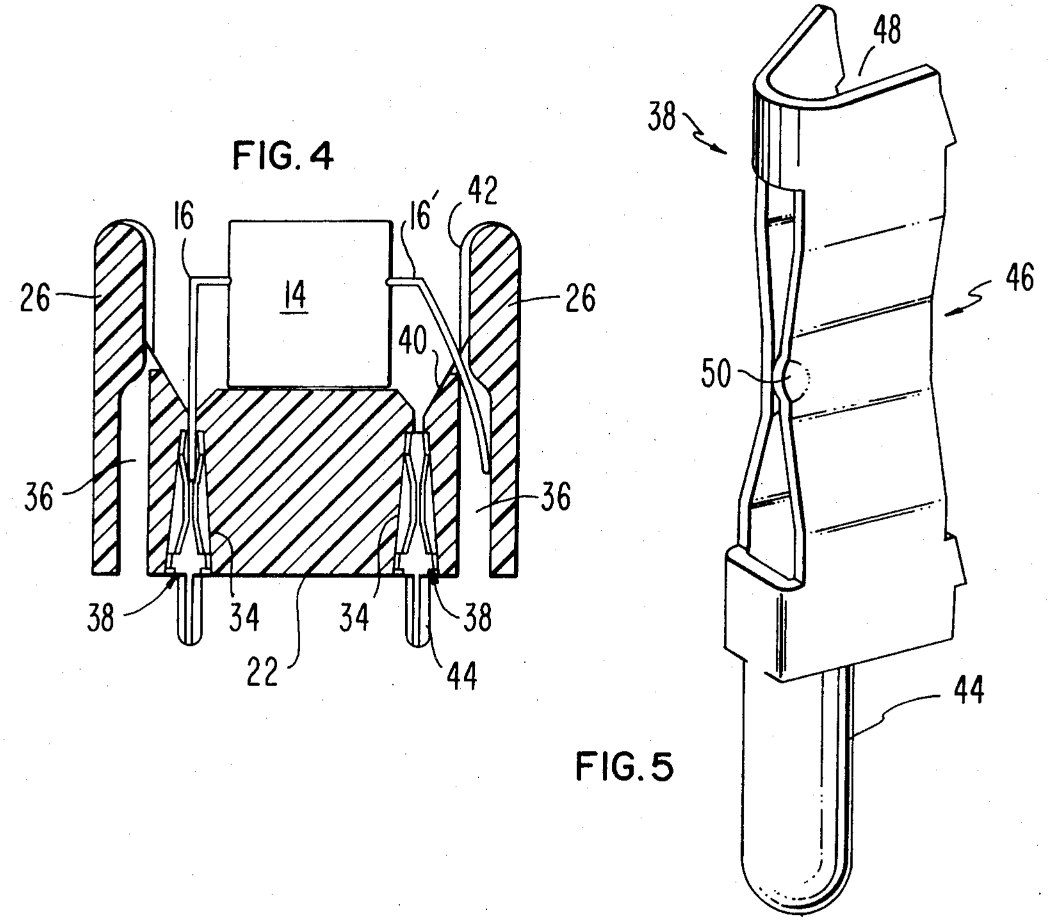
FIG. 4 is a similar cross-sectional view of connector block showing the integrated circuit unit fully seated within the channel of the block with both leads of FIG. 3 fully inserted into the recesses into which they were introduced.
FIG. 5 is an enlarged perspective view of one of the contact elements of the pin connector block and illustrating its crimped condition for grippingly engaging lead of an integrated circuit unit inserted thereinto.

The pin connector component 12 is generally U-shaped in cross-section as indicated in FIGS. 2 to 4 and is preferably formed of insulating plastic material molded into a unitary body or block 22. The U-shaped formation provides an elongated channel 24 which as shown in FIG. 1 may extend the full length of the plastic body forming the pin connector and opening out through the opposite ends thereof. The channel has a bottom 26 and similar side walls 28—28 which are so dimensionally related to the size of the integrated circuit component 10 that the latter may be substantially wholly received within the channel as best indicated in FIG. 4.

At the time the body or block 22 is molded, certain recesses are formed therein for the reception of the leads 16 and 16′ of the integrated circuit component 10. Actually, as illustrated herein, two pairs of parallel rows of recesses are molded into the body 22 such that they open into the channel 24 on opposite sides of the centerline thereof. One row of each pair of such rows, generally indicated at 30, is located nearer to the centerline than its companion row of recesses generally indicated at 32. With more specific reference to FIGS. 2 to 4 inclusive, the cross-sectional views show one recess 34 of each row 30 that is nearer to the centerline and one recess 36 of each row 32 that is more remote from the centerline and actually in the adjacent side wall of the pin connector body. It is apparent from the drawings that the recesses of the several rows corresponding in number and position to one another and for the purpose of performing an operative connection with the integrated circuit component 10 these recesses likewise correspond in number and position of the leads 16 and 16′ of the latter.

Fitted within each recess of the two rows of recesses 30—30 nearer to the centerline of the channel is an electrical contact pin 38 which is preferably of the type illustrated in enlarged condition in FIG. 5. Such a contact element is shaped so as to grippingly engage a lead 16 which is introduced into its respective recess 34 as in the manner illustrated in FIG. 4. However, in the illustrated embodiment of the invention, the recesses 36 of the rows 32—32 of the pin connector which are more remote from the centerline and located in the side walls 26—26 omit or are devoid of such a contact pin element as illustrated in FIG. 5, so that a lead 16′ entering the recess 36 will not make electrical contact with any conductive material therein. It is evident from the description thus far that the directly downwardly extending leads 16 are so located with respect to the inner rows 30—30 of the recesses as to enter the recesses 34 and engage electrically with the contact pin fitted therein. Similarly, it is evident that the outwardly bent leads 16′ have their extremities displaced laterally sufficiently to engage a side wall 26 of the connector body and be guided thereby for introduction into what may be characterized as a "dead" recess or cavity 36 of the pin connector component. However, it should be understood that the location of the contact pins 38 could be reversed and placed in the outer rows of recesses 32—32 leaving the inner rows of recesses 30—30 devoid of such pins. Moreover, connector pins of the character shown in FIG. 5 might be included in some or all of the recesses of the connector block 22 regardless of what row the recesses are in, and the projecting extremities of these inserted contact elements could be connected into different circuits.

As is evident in the several Figures applying to the pin connector block 22, the openings or mouths of recesses 30 and 32 are flared out to provide a lead guiding entranceway to each recess. Cooperating to this end, it will be noted that in these several Figures, and particularly FIG. 1, that the inner face of each side wall 26 is provided with an inclined surface 40 extending between the inner and outer rows of recesses 34 and 36 which assist in guiding the leads 16 into the inner rows of recesses. It is also apparent from the drawings that the outer rows of recesses 32—32 are disposed mainly in the side walls 26—26 and open out into the channel at the upper end of the inclined surface 40 of each side wall. It should be further noted that the inner face of each side wall 26 is provided with a plurality of ridges 42 rising out of the channel and each disposed between the mouths of adjacent recesses 36. All of the ridges on each side wall collectively form a comb assisting the guidance of the outwardly bent leads 16′ of the integrated circuit component 10 downwardly to the recess for which they are intended. It is apparent that these ridges 42 provide a shallow groove forming a further upward extension of the mouths of the outer rows of recesses 36 so that the inclined leads 16′ are guided into these mouths in the manner illustrated in the right-hand portion of FIG. 3.

Each connector pin 38 may be constructed like that illustrated in FIG. 5, as previously mentioned, and for this purpose it may be formed out of flat-stock, electrically conductive material and folded upon itself thereby to exhibit two main longitudinal sections, the external pin portion 44 and the internal lead gripping portion generally indicated at 46. The latter section is fitted into each recess and resistingly located therein in any suitable manner. The upper end 48 of the fold of each connector pin aligns with the upper narrow end of the recess into which it is fitted so that a flat strip lead 16 or 16′ may be slidably introduced thereinto. This section of the pin connector is further crimped upon itself as at 50 so as to grippingly engage the opposite sides of the lead or tab received therein. One such electrical contact between a lead 16 and a connector pin 38 is illustrated in the left portion of FIG. 4.

While a particular embodiment of the invention has been shown and described, it will be understood, of course, that it is not desired that the invention be limited thereto since modifications may be made, and it is, therefore, contemplated by the appending claims to cover any such modifications as fall within the true spirit and scope of the invention.

What is claimed is:

1. A dual-in-line pin connector for use with integrated circuit packages comprising, in combination:

a channel-shaped block of electrical insulating material having two pairs of correspondingly positioned, parallel rows of electrical lead receiving recesses extending longitudinally of the channel and opening thereinto, the two pairs of such rows of recesses being located on opposite sides of the centerline of the channel with one pair of such rows being adjacent to the juncture of one side wall of the channel with the bottom thereof and the other pair of such rows being adjacent to the juncture of the other side wall of the channel with the bottom thereof; and electrical contact elements fitted into the recesses of one row of each such pair of rows of recesses for making electrical contact with an electrical lead introduced thereinto, the recesses of the remaining row of each such pair of rows being devoid of any electrical contact therein.

2. The pin connector as defined in claim 1 characterized in that the opening of each such recess into the channel is outwardly flared on at least two opposite sides thereof to assist in guiding an electrical lead thereinto.

3. The pin connector as defined in claim 2 characterized in that the inside surfaces of the side walls of the channel are provided with parallel ribs rising upwardly from adjacent to the bottom of the channel and collectively forming on their respective side wall a comb for guiding electrical leads entering the channel to the openings of the nearest row of recesses.

4. A programmable dual-in-line pin connector for connection to a linear type integrated circuit package comprising, in combination:

a body of electrical insulating material having a channel therein including a bottom and opposite side walls rising upwardly from the bottom and further having two pairs of rows of electrical lead receiving recesses opening into the channel, said two pairs of rows extending parallel to one another and to the centerline of the channel and being so distributed in the channel that one pair of rows is adjacent to the juncture of one side wall of the channel with the bottom thereof and the other pair of such rows is adjacent to the juncture of the other side wall of the channel with the bottom thereof and that one row of each pair of rows being nearer to the centerline than the other row of the pair; and an electrical contact element fitted into each recess of one row of each pair of such rows and provided with a portion projecting externally from the side of the body opposite to the channel, each said electrical contact element being shaped to grippingly engage an electrical lead of a linear type integrated circuit package introduced into the opening of its recess to make an electrical connection therewith, the recesses of the other row of each such pair of rows being devoid of any electrical contact element therein but adapted to receive bent lead of a linear type integrated circuit package cooperatively engaged with the pin connector.

5. The pin connector as defined in claim 4 characterized in that the electrical contact elements are individually fitted into the recesses of the row of each pair of rows which is nearer to the centerline of the channel while the row of recesses more remote therefrom are devoid of such contact elements.

6. The pin connector as defined in claim 4 characterized in that the opening of each such recess into the channel is outwardly flared on at least one side thereof to assist in guiding an electrical lead thereinto.

7. The pin connector as defined in claim 6 characterized in that the inside surfaces of the side walls of the channel are provided with parallel ribs rising upwardly from adjacent to the bottom of the channel and collectively forming on their respective side walls of the channel a comb for guiding electrical leads of an integrated circuit package entering the channel.

8. A programmable integrated circuit assembly comprising, in combination:

an integrated circuit unit having two parallel rows of electrical leads projecting away from a side of the unit in one general direction;

a body of electrical insulating material having one side thereof formed with a channel therein including a bottom and opposite side walls rising upwardly from the bottom and further having two pairs of rows correspondingly positioned, electrical lead receiving recesses opening into the channel, said two pairs of rows extending parallel to one another and to the centerline of the channel and being so distributed in the channel that one pair of rows is adjacent to the juncture of one side wall of the channel with the bottom thereof and the other pair of such rows is adjacent to the juncture of the other side wall of the channel with the bottom thereof and further that one row of each such pair of rows is nearer to the centerline of the channel than the other row of the pair;

said channel being so dimensionally related to the size of the integrated circuit unit that the latter is substantially wholly received therewithin with each lead of the unit received in one or the other of the correspondingly positioned recesses of each pair of rows of recesses; and electrical contact elements fitted into at least certain of said recesses, each said electrical contact element being engaged with the electrical lead of the integrated circuit unit entering its recess for making an electrical connection therewith.

9. A programmable integrated circuit assembly as defined in claim 8 characterized in that said electrical contact elements are individually fitted into the recesses of one row of each said pair of rows and are provided with a portion projecting externally from a side of the body other than that in which the channel is formed, each said electrical contact element being shaped to grippingly engage an electrical lead of the integrated circuit unit entering its recess and to make electrical connection therewith.

10. A programmable integrated circuit assembly as defined in claim 9 characterized in that the electrical leads of each such row of leads project from the integrated circuit unit in two different planes for selective introduction and reception in the recesses on one side of the centerline of the channel either nearer to or more remote therefrom.

11. A programmable integrated circuit assembly as defined in claim 10 characterized in that the rows of recesses more remote from the centerline open into the channel on a level above the rows of recesses nearer to the centerline of the channel.

12. A programmable integrated circuit assembly as defined in claim 11 characterized in that each row of recesses more remote from the centerline of the channel are at least partially disposed in an individual one of the side walls of the channel and open into the channel on a common level higher than the openings of the rows of recesses nearer to the centerline.

* * * * *